United States Patent
Stephens

(10) Patent No.: US 7,402,619 B2
(45) Date of Patent: Jul. 22, 2008

(54) CROSS-LINKING COMPOSITIONS FOR POLYMER-MODIFIED ASPHALT COMPOSITIONS

(75) Inventor: Keith E. Stephens, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 398 days.

(21) Appl. No.: 11/095,368

(22) Filed: Mar. 31, 2005

(65) Prior Publication Data

US 2006/0223915 A1    Oct. 5, 2006

(51) Int. Cl.
*C08L 95/00* (2006.01)

(52) U.S. Cl. .............................. 524/68; 524/69; 524/70; 524/71; 524/202; 524/400; 524/432

(58) Field of Classification Search .................. 523/351; 524/68–71, 202, 400, 432
See application file for complete search history.

(56) References Cited

U.S. PATENT DOCUMENTS

| | | | |
|---|---|---|---|
| 3,378,510 A * | 4/1968 | Wheat | ......................... 524/202 |
| 4,145,322 A | 3/1979 | Maldonado et al. | |
| 4,242,246 A | 12/1980 | Maldonado et al. | |
| 4,535,095 A * | 8/1985 | Mueller | ......................... 521/89 |
| 5,618,862 A | 4/1997 | Germanaud et al. | |
| 6,025,418 A | 2/2000 | Defoor et al. | |
| 6,232,394 B1 | 5/2001 | Bonhomme et al. | |
| 6,333,375 B1 * | 12/2001 | Nakamura et al. | .......... 524/394 |
| 6,569,925 B2 | 5/2003 | Baumgardner et al. | |
| 6,767,939 B2 | 7/2004 | Butler et al. | |
| 2004/0054038 A1 | 3/2004 | Andriolo | |
| 2004/0249024 A1 | 12/2004 | Buras et al. | |

* cited by examiner

*Primary Examiner*—Peter Szekely
(74) *Attorney, Agent, or Firm*—Michael A Masse

(57) ABSTRACT

The present invention relates to a bituminous composition comprising a bituminous component, an elastomeric polymer component, and a specific cross-linking composition component comprising elemental sulfur, a sulfur-containing derivative, a sulfur activator, a fatty acid or fatty acid derivative and a polymeric carrier. Compositions according to the invention are particularly useful in preparing polymer-modified asphalt ("PMA") for road applications.

17 Claims, No Drawings

CROSS-LINKING COMPOSITIONS FOR POLYMER-MODIFIED ASPHALT COMPOSITIONS

FIELD OF THE INVENTION

The present invention relates to polymer modified asphalt compositions and methods for the preparation of these compositions. In particular, the present invention relates to a masterbatch cross-linking composition that may be added to asphalt and polymer compositions that serves as an accelerator for the polymer/asphalt compositions.

BACKGROUND OF THE INVENTION

Polymer-modified asphalt ("PMA") and methods for preparing various PMA compositions are well known. Polymers, including diene elastomers such as EPDM, EPR and thermoplastic elastomers such as styrene-butadiene and styrene-isoprene block copolymers, are commonly combined with asphalt to improve the performance of the asphalt. It has long been known to add sulfur to the PMA to strengthen and accelerate the polymer-asphalt bonding and curing process. See, for example, U.S. Pat. No. 4,145,322 and U.S. Pat. No. 4,242,246, both listing Paul Maldanado as a co inventor. Various forms of sulfur are used, including elemental sulfur and sulfur-donating compounds. In many cases the sulfur is added as a powder, pellet, flake or in a mixture with other components. For example, U.S. Pat. No. 6,025,418 discloses a process for preparing PMA compositions using a mixture of vulcanizing agents including certain sulfur-donating derivatives, elemental sulfur and an alkaline compound that is soluble in the asphalt.

U.S. Pat. No. 6,569,925 discloses an accelerator-gel additive for use in the production of polymer-modified asphalt. In the system disclosed in the '925 patent, the accelerator-gel additive suspends the accelerator in a gel system preventing the sedimentation of the accelerator during processing. As a result, the polymer and asphalt are processed at lower temperatures, thereby reducing the production of toxic and flammable gases such as hydrogen sulfide. However, there are problems in handling the gel, and it must normally be stored in sealed containers to prevent possible oxidation—not normally a process that is usually available to typical asphalt modifiers.

U.S. Pat. No. 6,767,939 discloses a method for preparing polymer-modified asphalt compositions wherein a certain cross-linking composition is added to the elastomer/asphalt mixture and allowed to cure over a time period of at least forty-five minutes. The cross-linking composition comprises 2-mercaptobenzothiazole, elemental sulfur, zinc oxide, tetramethylthiuram disulfide and stearic acid. However, the composition in the '939 patent requires very low levels of stearic acid to be effective. This has the disadvantage of high generation of hydrogen sulfide.

US Published Pat. Application 2004/0249024 discloses the use of a dispersing agent that facilitates the delivery of a cross-linking agent to polymer-modified asphalt. One of the dispersing agents disclosed in the '024 application is 2-ethylhexyl acid phosphate. Use of such a dispersant has it's own problems, and does not fit well with typical asphalt handling facilities.

What is needed is a process for preparing improved polymer-modified asphalt compositions that can be used in existing asphalt facilities, and does not generate excessive amounts of hydrogen sulfide. Ideally, such a process would be easy to use, stable in storage, and result in quick cross-linking of polymer and asphalt.

SUMMARY OF THE INVENTION

As result of extensive research and experimentation, a new cross linking composition has been found that is easy to use in existing asphalt blending facilities, results in improved polymer-modified asphalt compositions, has excellent storage stability, is relatively quick acting, and significantly reduces the generation of hydrogen sulfide as compared with other commercially available cross linking compositions.

Accordingly, the invention relates to a cross-linking composition for use in preparing bitumen/elastomeric polymer mixtures, said cross-linking composition comprising:

a. 5 to 50 percent by weight of elemental sulfur:

b. 0.5 to 10 percent by weight of a sulfur-containing derivative selected from the group consisting of compounds having the formula:

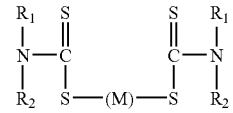

where $R_1$ and $R_2$ are like or different alky radicals having 1 to 4 carbon atoms and wherein M is selected from the group consisting of zinc, barium, copper, cadmium and thallium;

c. 5 to 50 percent by weight of a sulfur activator selected from zinc, copper, cadmium or other metal compounds;

d. 5 to 50 percent by weight of a solubilizing agent selected from fatty acids and fatty acid derivatives, such as calcium stearate or zinc stearate, to assist in solubilizing the zinc or metal activator and act as an accelerator; and e. 10 to 85 percent by weight of a polymeric carrier, said cross-linking composition having a zinc content of at least 2 weight percent, based on the total weight of the cross-linking composition and a zinc to sulfur content weight ratio of 0.5:1 to 2:1. The zinc metal can come from the sulfur-containing derivative, the sulfur activator, or the solubilizing agent, or a combination of any of those three components. The zinc is an important element of the present invention in that zinc is a mitigating factor in the reaction by-product, hydrogen sulfide. In addition, the activator and solubilizing agent may be combined in a single component, such as a metal fatty acid derivative, including zinc stearate or calcium stearate, preferably zinc stearate. Further, the invention also relates to a method for preparing bitumen/elastomeric polymer compositions comprising:

a. heating the bitumen in a stirred tank to a temperature of between 220 and 430° F.;

b. adding the elastomeric polymer to the tank in an amount of between 2 and 30 weight percent, to form a mixture of bitumen and elastomeric polymer; and c. adding 0.01 to 5 percent by weight of a cross-linking composition to the mixture, (all amounts being based on the total amount of bitumen, elastomeric polymer and cross-linking component), and continuing stirring while maintaining the temperature of the mixture at between 275 and 430° F. for a time period of between 20 and 120 minutes; wherein the cross-linking composition is that composition described above.

As shown in the Examples and disclosures that follow, the cross-linking composition of the present invention can be available as a soft, solid pellet or as a bead or a crumb or a powder. It dissolves easily in asphalt, even with low shear, and can be used in existing asphalt handling facilities.

It has been found that reaction between the asphalt and elastomeric polymer will typically take place in about 30-45 minutes, which is about twice as fast as the current commercial cross-linking composition on the market now. In addition, hydrogen sulfide generation is significantly lower with the claimed cross-linking composition than that cross-linking composition currently on the market.

DETAILED DESCRIPTION OF THE INVENTION

The present invention finds particular utility in the preparation of PMA for roads and pavements of all sorts. It is possible with the compositions of the present invention to prepare PMA and other asphalt compounds that exhibit improved stability in tank storage, such as for various roofing adhesives, sealing products, or weatherproofing/waterproofing compounds (e.g., tab adhesive or laminating adhesives for shingles and adhesive backing layers for roofing sheet products).

Elastomeric polymers used in the invention are natural or synthetic rubbers and include butyl rubber, polybutadiene, polyisoprene, ethylene/propylene/diene (EPDM) terpolymers, and styrene/conjugated diene block or random copolymers. In a preferred embodiment, the elastomeric polymer is a styrene/butadiene, styrene/isoprene, or styrene/isoprene-butadiene block copolymer. The block copolymers preferred in the present invention may be branched or linear and may be a diblock, triblock, tetrablock or multiblock. Preferably, it has a structure represented by one or more block copolymers, or a mixture of block copolymers having the following general formulae $$S—B—S \text{ (I), or } (S—B)_n—X \text{ (II), and may contain}$$
$$\text{varying amounts of diblock } S—B \text{ (III) up to}$$
$$100\%$$

wherein each S independently is a poly(vinyl aromatic) block and each B independently is a poly(conjugated diene) block, n is an integer equal to or greater than 2 and X is the residue of a coupling agent or multifunctional monomer.

It will be appreciated that the most preferred vinyl aromatic monomer is styrene, which is used as substantial pure monomer or as major component in mixtures with minor proportions of other structurally related vinyl aromatic monomer(s) such as o-methylstyrene, p-methylstyrene, p-tert-butylstyrene, 2,4-dimethylstyrene, α-methylstyrene, vinylnaphtalene, vinyltoluene and vinylxylene, i.e. in proportions of at most 10 wt %. The use of substantial pure styrene is most preferred. Preferably the true molecular weight of the poly (vinyl aromatic) blocks is in the range of from 12,000 to 28,000 and preferably from 15,000 to 25,000.

Similarly, the butadiene and isoprene monomers for the preparation of the conjugated diene blocks, can be substantially pure monomer ingredients or can contain minor proportions of structurally related conjugated dienes, such as 2,3-dimethyl-1,3-butadiene, 1,3-pentadiene and 1,3-hexadiene, up to 10 wt %. The use of substantially pure butadiene and substantially pure isoprene is preferred.

The term "diblock content", as used throughout the present specification, is meant as that proportion of free diblock which is finally present in the applied block copolymer. It will be appreciated that when the block copolymer is prepared via a full sequential polymerization, no detectable amounts of free diblock copolymers will occur and the finally desired diblock amount can be adjusted if desired.

When the block copolymers have been prepared via the initial preparation of intermediate living diblock copolymers, which are subsequent coupled by means of a multivalent coupling agent, the initial diblock content will be determined by the coupling efficiency, which is normally in the range of from 85% to 97%. However, it is possible to use polymers with high levels of diblock, such as KRATON® D1118, which has a diblock content of 80 mole %. Accordingly, the diblock content may typically range from 0 to 85 mole %. In some case, with highly coupled polymers, the diblock content may range from 0 to 15%. With other low-coupled polymers the diblock content may range from 65 to 85 mole %. It is also possible to use a polymer that is up to 100% diblock copolymer. This is one of the advantages of the presently claimed cross-linking composition—the ability to handle low-coupled polymers, which will disperse readily, and be chemically cross-linked, by the cross-linking composition.

The block copolymers, which are useful as modifiers in the bituminous compositions according to the present invention, may be prepared by any method known in the art including the well known full sequential polymerisation method, optionally in combination with reinitiation, and the coupling method, as illustrated in e.g. U.S. Pat. Nos. 3,231,635; 3,251,905; 3,390,207; 3,598,887 and 4,219,627 and EP 0413294 A2, 0387671 B1, 0636654 A1, WO 04/22931.

The block copolymer may therefore, for example, be prepared by coupling at least two diblock copolymer molecules together. The coupling agent may be any di- or polyfunctional coupling agent known in the art, for example, dibromoethane, silicon tetrachloride, diethyl adipate, divinylbenzene, dimethyldichlorosilane, methyl dichlorosilane. Particularly preferred in such a preparation route is the use of non-halogen containing coupling agents, for example gamma-glycidoxypropyl-trimethoxysilane, tetraethoxysilane and the diglycidylether of bisphenol A.

In general, the polymers useful in this invention may be prepared by contacting the monomer or monomers with an organoalkali metal compound in a suitable solvent at a temperature within the range from −150° C. to 300° C., preferably at a temperature within the range from 0° C. to 100° C. Particularly effective polymerization initiators are organolithium compounds having the general formula RLi wherein R is an aliphatic, cycloaliphatic, alkyl-substituted cycloaliphatic, aromatic or alkyl-substituted aromatic hydrocarbon radical having from 1 to 20 carbon atoms of which sec butyl is preferred.

Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Suitable solvents, then, include aliphatic hydrocarbons such as butane, pentane, hexane and heptane, cycloaliphatic hydrocarbons such as cyclopentane, cyclohexane and cycloheptane, alkyl-substituted cycloaliphatic hydrocarbons such as methylcyclohexane and methylcycloheptane, aromatic hydrocarbons such as benzene and the alkyl-substituted aromatic hydrocarbons such as toluene and xylene, and ethers such as tetrahydrofuran, diethylether and di-n-butyl ether. Preferred solvents are cyclopentane or cyclohexane.

Techniques to enhance the vinyl content of the conjugated diene portion are well known and may involve the use of polar compounds such as ethers, amines and other Lewis bases and more in particular those selected from the group consisting of dialkylethers of glycols. Most preferred modifiers are selected from dialkyl ether of ethylene glycol containing the same or different terminal alkoxy groups and optionally bearing an alkyl substituent on the ethylene radical, such as monoglyme, diglyme, diethoxyethane, 1,2-diethoxypropane, 1-ethoxy-2,2-tert-butoxyethane, of which 1,2-diethoxypropane is most preferred.

The bituminous component present in the bituminous compositions according to the present invention may be naturally occurring bitumen or may be derived from a mineral oil. Also petroleum pitches obtained by a cracking process and coal tar can be used as the bituminous component as well as blends of various bituminous materials. Examples of suitable components include distillation or "straight-run bitumens", precipitation bitumens, e.g. propane bitumens, blown bitumens, e.g. catalytically blown bitumen or "Multiphate", and mixtures thereof. Other suitable bituminous components include mixtures of one or more of these bitumens with extenders (fluxes) such as petroleum extracts, e.g. aromatic extracts, distillates or residues, or with oils. Suitable bituminous components (either "straight-run bitumens" or "fluxed bitumens") are those having a penetration of in the range of from 25 to 300 dmm at 25° C.; therefore quite hard bitumens of a penetration of from 60 to 70 dmm may be used, but generally a straight run or distilled bitumen having a penetration in the range of from 110 to 250 dmm will be the most convenient to use. Both compatible as well as incompatible bitumens may be used.

The polymer modifier is suitably present in the bituminous composition in an amount of from 2 to 30% by weight, more typically from 2.5 to 10% by weight, and most preferably from 2.5 to 6% by weight.

The bituminous composition may also, optionally, contain other ingredients such as may be required for the end-use envisaged. Thus fillers may be included, for example talc, calcium carbonate and carbon black, or other components including resins, oils, stabilisers or flame retardants may be incorporated. The content of such fillers and other components may be in the range of from 0 to as much as 40% by weight. Of course, if advantageous, other polymer modifiers may also be included in the bituminous composition of the invention.

The cross linking composition of the present invention has a number of components, including elemental sulfur, sulfur-containing derivatives, sulfur activating components selected from zinc compounds, fatty acids or fatty acid derivatives, and polymeric carriers that will facilitate extrusion of pellets if desired.

Elemental sulfur can be used in any of its physical forms. Preferably, the elemental sulfur is termed flowers of sulfur and preferably sulfur crystallized in the orthorhombic form and known as alpha sulfur. The sulfur-containing derivative is selected from the group consisting of compounds having the formula below, where $R_1$ and $R_2$ are like or different alkyl radicals having 1 to 4 carbon atoms, and wherein M is zinc, barium, copper, cadmium or thallium:

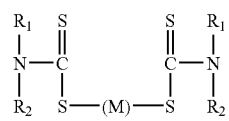

In a preferred embodiment the metal is zinc, and more preferably, the sulfur-containing derivative is selected from the group consisting of zinc dimethyl dithio carbamate and zinc diethyl dithio carbamate, with zinc dimethyl dithio carbamate being most preferred. Zinc dimethyl dithio carbamate can be obtained from R.T. Vanderbilt Company, Inc, and the trade name is Methyl Zimate®.

Another of the components is a fatty acid or fatty acid derivative. Examples of suitable components include stearic acid, calcium stearate, and zinc stearate. Also included in the cross-linking compositions of the present invention is a sulfur activator selected from metal compounds, including zinc, copper and cadmium compounds. Preferred compounds are zinc compounds such as zinc oxide, zinc stearate and zinc halides, such as zinc chloride, zinc bromide and zinc fluoride. Most preferably the zinc compound is zinc oxide or zinc stearate. When the zinc compound is zinc stearate, it is not necessary to add a fatty acid or fatty acid derivative component—the zinc stearate will serve as both components.

The other component that is required is a polymeric carrier that will be used to bind the various components together for ease of use. Typical polymeric components include ethylene/propylene rubber (such as Vistalon® EPR), low molecular weight polyethylene (such as Epolene C-10), and ethylene/vinyl acetate (EVA) copolymers. This polymeric component is particularly useful when forming pellets, as described in US Pub. Pat. Appl. 2004/054038. Another means to bind the various components is to form beads. In addition, small amounts of pigments, such as carbon black or blue pigments, may also be added for consistency. Other forms include powder and crumb. Preferred forms are pellets and beads, with pellets being most preferred.

The relative amounts for each of the components in the cross-linking composition are shown below in Table A. The amounts are shown in weight percentage of just the masterbatch cross-linking composition. When used in the PMA, the net amount is typically about 0.04% weight to 0.20% weight of the overall bitumen/elastomeric polymer mixture, depending upon the relative concentration of sulfur components in the cross-linking composition. Shown below in Tables B and C are two separate formulations, based on differing concentrations and differing polymeric carriers. For Table B, the cross-linking composition was used at 0.1% treat rate into an asphalt/polymer mix, and the amount of polymer added to the asphalt was 3-5% weight. For Table C, a more concentrated cross-linking composition was used at a treat rate of 0.05% into an asphalt/polymer mix containing 3-5% polymer.

TABLE A

| | Amount | |
|---|---|---|
| Component | Broad (% w) | Preferred (% w) |
| Sulfur | 5 to 50 | 8 to 30 |
| Sulfur-containing derivative | 0.5 to 10 | 0.7 to 5 |
| Sulfur activator | 5 to 50 | 8 to 30 |
| Fatty acid or Fatty acid Derivative | 5 to 50 | 8 to 30 |
| Polymeric carrier | 10 to 85 | 24 to 70 |
| Total | 100% | 100% |

TABLE B

| Component | Master batch Amount | Net amount into the asphalt blend |
|---|---|---|
| Sulfur | 12% | 0.0120% |
| Zinc oxide | 12% | 0.0120% |
| Calcium stearate | 12% | 0.0120% |

TABLE B-continued

| Component | Master batch Amount | Net amount into the asphalt blend |
|---|---|---|
| Zinc dimethyl dithio carbamate | 0.5% | 0.0005% |
| Carbon black (minor pigment) | Trace % | 0.0001% |
| Epolene C-10 polyethylene | 63.4% | 0.063% |

TABLE C

| Component | Master batch Amount | Net amount into the asphalt blend |
|---|---|---|
| Sulfur | 23% | 0.0115% |
| Zinc oxide | 23% | 0.0115% |
| Calcium stearate | 23% | 0.0115% |
| Zinc dimethyl dithio carbamate | 1.0% | 0.0005% |
| Blue pigment | Trace % | 0.0001% |
| EPM Ethylene propylene random copolymer (Ethylene propylene rubber) | ~30% | 0.015% |

PMAs produced according to the present invention are typically used in road pavements, according to known standards. One of the recent improvements in testing PMA is the use of Performance Grades. These are described in the booklet SUPERPAVE Series No 1 (SP-1), 1997 printing, published by the Asphalt Institute, Research Park Drive, PO Box 14052, Lexington, Ky. 40512. Asphalt grading is given in accordance with accepted standards in the industry. The asphalt compositions are given performance grades. For example, PG 70-22. The first number, 70, represents the average 7-day maximum pavement design temperature in degrees C. The second number, -22, represents the minimum pavement design temperature in degrees C. Other requirements of each grade are shown in the table found at pages 62-65 of the above-mentioned booklet. For example, the maximum value for the PAV-DSR test (° C.) for PG 70-22 is 28° C.

The following Examples illustrate the present invention, however without restricting its scope to these specific embodiments.

EXAMPLES 1-4

Examples 1-4, found in Tables 1, 2 and 3, show the effect of incorporating the cross-linking composition of the present invention in PMA compositions, either as a powder or as a pellet.

The bitumen grade that was used for the listed Examples 1-4 found in Table 1 is a Mid-Continent type asphalt, which is a PG 58-28.

The polymers used was KRATON® D1101. D1101 is a linear, coupled S—B—S block copolymer having an overall molecular weight of about 170,000 and a styrene content of 31% w.

Four different samples were prepared. Sample Number 1 comprised only the asphalt. Sample Number 2 contained the bitumen and the elastomer, but no cross-linking agent. Sample Number 4 contained the bitumen, elastomer and the cross-linking composition detailed in Table 1 in the form of a powder. Sample Number 3 contained the same components as Sample Number 4, but the cross-linking composition was in the form of a pellet when it was added to the elastomer/asphalt composition.

Asphalt and polymer were mixed in a high shear Silverson L4R® mixer at 365° F. When the polymer appeared homogenous, the crosslinking ingredients (if any) were added. Evolution of $H_2S$ can be monitored. When the $H_2S$ evolution stops, the sample can be removed from mixing, generally after 20-40 minutes. If $H_2S$ monitoring is not done, then blending continues for 90-120 minutes to assure completion. The blended composition was kept warm for 2-24 hours (simulating a static storage tank) In this case, this phase (digestion) was for 6 hours, if crosslinking ingredients were added.

$H_2S$ monitoring utilized a Hubbell, Killark detector and a Detcon Incorporated, $H_2S$ cell. This was attached to a digital data acquisition interface from Dataq Instruments.

Test methods utilized to compare the samples were:

Penetration—ASTM D5, @77° F.

Softening point—ASTM D36

Storage stability—ASTM D5892

SuperPave Performance Grade, including viscosity—

Were done according to MP1 guidelines published by The American Association of State Highway and Transportation Officials (AASHTO).

The data in Tables 2 and 3 show the significant improvements that result from the use of the cross-linking composition of the present invention. Comparison of Samples 1 and 2 show the improvement of high temperature PG properties when adding polymer to the asphalt alone. There is an improvement of two service grades moving from 58 through 64 to 70. Also seen is a detrimental effect on low temperature properties. The −28 grade is no longer achieved. In addition, desirable storage stability properties do not exist in Sample 2. Separation of the polymer/asphalt mixture occurs during the procedure.

Samples 3 and 4 are similar except for the physical form of the crosslinking compound. Sample 3 is a pelletized version of the ingredients, and Sample 4 is comprises mostly individual powder forms of the same components. For Sample 4, these components were all added to the mixture simultaneously. Positive effects for Samples 3 and 4 can be seen in storage stability values where both samples now pass the test. The detrimental effect on low temperature properties that was seen in Sample 2 has been mitigated and no longer appears. Both Samples 3 and 4 have gained improvements in high temperature grade, improved storage stability and did not loose low temperature grade as might have been expected.

TABLE 1

| | Sample Number | | | |
|---|---|---|---|---|
| | 1 | 2 | 3 | 4 |
| Base Asphalt, % w | 100.0 | 96.50 | 96.45 | 96.45 |
| KRATON 1101, % w | | 3.50 | 3.50 | 3.50 |
| Pelletized Cross Linking Composition, % w | | | 0.05 | |
| Ethylene Propylene Rubber, % w | | | | .0150 |
| Sulfur, % w | | | | .0115 |
| Calcium Stearate, % w | | | | .0115 |
| Zinc Oxide, % w | | | | .0115 |
| Methyl Zimate, % w | | | | .0005 |
| Total % | 100.00 | 100.00 | 100.00 | 100.00 |

TABLE 2

Data summary

|  | 1 | 2 | 3 | 4 |
|---|---|---|---|---|
| Mix Time (Hours) | 0 | 1 | 2 | 2 |
| Digestion Time (Hours) | 0 | 0 | 6 | 6 |
| Penetration, 77 Deg. F. | 83 | 64 | 63 | 64 |
| Viscosity (cP) @ 135 C. | 270 | 855 | 975 | 1030 |
| Softening Point F. | 134 | 132 | 130 | 131 |
| Storage Stability, Softening Point ASTM D5892 | | | | |
| Top (C.) | | 194 | 142 | 142 |
| Bottom (C.) | | 124 | 140 | 140 |
| Diff. (C.) | | 70 | 2 | 2 |
| SuperPave Performance Grade | 58-28 | 70-22 | 70-28 | 70-28 |
| Dynamic Shear Rheometer (G*/sinδ) | | | | |
| Original sample | | | | |
| Calculated pass/fail temperature (C.) | 60.0 | 70.6 | 72.1 | 73.3 |
| RTFO sample | | | | |
| Calculated pass/fail temperature (C.) | 61.1 | 71.3 | 71.1 | 71.4 |
| Bending Beam Rheometer | | | | |
| Calculated pass/fail temperature (C.) | −30.6 | −27.3 | −31.8 | −31.9 |

TABLE 3

Performance Grade data detail

|  |  | 1 | 2 | 3 | 4 |
|---|---|---|---|---|---|
| Dynamic Shear Rheometer Original sample | | | | | |
| Calculated pass/fail temperature (C.) | | 60.0 | 70.6 | 72.1 | 73.3 |
| (G*/sinδ), | @ 58 C. | 1.3 | 4.0 | | |
| | @ 64 C. | .6 | 1.9 | 2.1 | 2.4 |
| | @ 70 C. | | 1.0 | 1.2 | 1.3 |
| | @ 76 C. | | .6 | .7 | .8 |
| Phase Angle, | @ 58 C. | 87.7 | 76.2 | | |
| | @ 64 C. | 88.6 | 78.2 | 76.9 | 77.8 |
| | @ 70 C. | | 78.3 | 76.7 | 78.9 |
| | @ 76 C. | | 76.6 | 73.3 | 78.8 |
| Digested sample (RTFO) | | | | | |
| Calculated pass/fail temperature (C.) | | 61.1 | 71.3 | 71.1 | 71.4 |
| (G*/sinδ), | @ 58 C. | 3.3 | | | |
| | @ 64 C. | 1.5 | 5.1 | 4.6 | 4.6 |
| | @ 70 C. | | 2.5 | 2.5 | 2.5 |
| | @ 76 C. | | 1.3 | 1.3 | 1.4 |
| Phase Angle, | @ 58 C. | 84.3 | | | |
| | @ 64 C. | 86 | 75.5 | 71.3 | 71.8 |
| | @ 70 C. | | 79.5 | 74.2 | 74.6 |
| | @ 76 C. | | 82.3 | 75.7 | 76.7 |
| Bending Beam Rheometer | | | | | |
| Calculated pass/fail temperature (C.) | | −30.6 | −27.3 | −31.8 | −31.9 |
| "S" calculated (C.) | | −20.9 | −20.5 | −23.1 | −23.1 |
| "m" calculated (C.) | | −20.6 | −17.3 | −21.8 | −21.9 |

EXAMPLES 5-8

In Examples 5-8, a comparison is made between the cross-linking composition of the present invention and Finaflex PAXL® Cross-linking reagent, a commercial cross-linking composition available from Atofina Elastomers. It is believed that the PAXL reactant contains a polymeric binder, about 12% sulphur and trace amounts of butyl zimate. The zinc content in the PAXL reactant is much less than that found in the masterbatch cross-linking composition of the present invention. In Examples 5 and 6, a comparison is made between asphalt compositions containing 3.5 weight percent of KRATON® D1184, where Sample 5 contains 0.1 weight percent of PAXL and Sample 6 contains 0.05 weight percent of a cross-linking composition according to the present invention. The cross-linking composition according to the present invention comprises the following:

| Elemental sulfur percent | 23 weight |
|---|---|
| Zinc oxide percent | 23 weight |
| Calcium stearate percent | 23 weight |
| Zinc dimethyl dithio carbamate percent | 1.0 weight |
| Blue pigment | trace |

Ethylene/Propylene Random Copolymer 30 Weight Percent

In Examples 7 and 8, a comparison is made is made between asphalt compositions containing 3.5 weight percent of KRATON® D1101, where Sample 7 contains 0.1 weight percent of PAXL and Sample 8 contains 0.1 weight percent of a cross-linking composition according to the present invention.

Since the cross-linking composition of the present invention contains 23% sulphur, when comparing Sample 5 and Sample 6, only half the amount of the cross linking agent according to the present invention is used compared with the amount of PAXL reactant—since the cross-linking composition according to the present invention is more concentrated than PAXL. In Examples 7 and 8, Samples 7 and 8 containing the same amount of cross-linker are used, even though lesser amounts could have been used for the cross-linking composition according to the invention. Both the compositions according to the present invention and the PAXL reactant were used in pellet form.

KRATON D1184 is a radial, coupled styrene butadiene block copolymer having the structure $(S—B)_nX$ and containing about 16 mole percent S—B diblock. The styrene content of D1184 is 31% w, and the S—B molecular weight is about 67,000. Molecular weights described herein for the styrene/conjugated diene block copolymers are true molecular weights.

Asphalt and respective polymers were mixed in a high shear Silverson L4R® mixer at approximately 365° F. When the polymer appeared homogenous (10-30 minutes), respective crosslinking ingredients were added. Evolution of $H_2S$ gas was monitored using a Hubbell, Killark detector, and a Detcon Incorporated, $H_2S$ cell. The $H_2S$ cell was mounted into a vent stack attached to the mixing container such that it was directly in the flow of gasses exiting the top of the mixture. The detector was connected to a digital data acquisition interface supplied by Dataq Instruments. This information was acquired to calculate concentrations of $H_2S$ exiting the mixture on a constant basis. The area under the curve of this response, as a function of time, can give relative data regarding similar samples.

As shown in Table 4, Sample 5, the composition containing PAXL, generated almost five times the amount of hydrogen sulfide as that generated with the composition according to the present invention. When comparing the two cross-linkers at equal amounts in Sample 6, the composition containing PAXL, generated over twice the amount of hydrogen sulfide as that with the cross-linking composition of the present invention. Asphalt and polymer were mixed in a high shear Silverson L4R® mixer at 365° F. When the polymer appeared homogenous, the crosslinking ingredients were added. Evolution of $H_2S$ can be monitored. When the $H_2S$ evolution stops, the sample can be removed from mixing, generally after 20-40 minutes. The compositions were kept warm for 2-24 hours (simulating a static storage tank). In this case, this phase (digestion) was for 6 hours.

TABLE 4

| | Sample No. | |
|---|---|---|
| | 5<br>3.5% D1184<br>w/PAXL | 6<br>3.5% D1184<br>w/claimed mixture |
| Amount of crosslinker added | 0.1% | 0.05% |
| Area of H$_2$S generation curve (ppm-seconds) | 75,972 | 15,877 |
| Time till H$_2$S release <5 ppm | >61 minutes | 34 minutes |
| Time till H$_2$S release ~0 ppm | >61 minutes | 47 minutes |
| PG grade | 70-28 | 70-28 |

| | Sample No. | |
|---|---|---|
| | 7<br>3.5% D1101<br>w/Paxl | 8<br>3.5% D1101<br>w/claimed mixture |
| Amount of crosslinker added | 0.1% | 0.1% |
| Area of H$_2$S generation curve (ppm-seconds) | 184,796 | 74,275 |
| Time till H$_2$S release <5 ppm | >63 minutes | 47 minutes |
| Time till H$_2$S release ~0 ppm | >63 minutes | 43 minutes |
| PG grade | 70-28 | 70-28 |
| Storage stability | Pass | Pass |

What is claimed is:

1. A method for preparing bitumen/elastomeric polymer compositions comprising:
   a. heating the bitumen in a stirred tank to a temperature of between 220 and 430° F.;
   b. adding the elastomeric polymer to the tank in an amount of between 2 and 30 weight percent, to form a mixture of bitumen and elastomeric polymer;
   c. adding 0.01 to 5 weight percent of a cross-linking composition to the mixture and continuing stirring while maintaining the temperature of the mixture at between 275 and 430° F. for a time period of between 20 and 120 minutes;
   wherein said cross-linking composition comprises:
      a. 5 to 50 percent by weight of elemental sulfur:
      b. 0.5 to 10 percent by weight of a sulfur-containing derivative selected from the group consisting of compounds having the formula

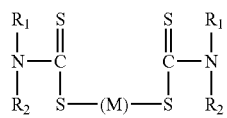

where R$_1$ and R$_2$ are like or different alky radicals having 1 to 4 carbon atoms and wherein M is selected from the group consisting of zinc, barium, copper, cadmium and thallium;
      c. 5 to 50 percent by weight of a sulfur activator selected from zinc compounds;
      d. 5 to 50 percent by weight of a solubilizing agent selected from fatty acids and fatty acid derivatives; and
      e. 10 to 85 percent by weight of a polymeric carrier,
   said cross-linking composition having a zinc content of at least 2 weight percent, based on the total weight of the cross-linking composition and a zinc to sulfur content weight ratio of 0.5:1 to 2:1.

2. The method according to claim 1 wherein said bitumen is selected from the group consisting of straight-run bitumens and fluxed bitumens.

3. The method according to claim 2 wherein said elastomeric polymer is selected from the group consisting of butyl rubber, polybutadiene, polyisoprene, ethylene/propylene/diene (EPDM) terpolymers, and styrene/conjugated diene block copolymers.

4. The method according to claim 3 wherein said elastomeric polymer is a styrene/conjugated diene block copolymer having a structure represented by the following general formulae S—B—S, (S—B)$_n$—X, (S—B) or a mixture thereof, wherein each S independently is a poly(vinyl aromatic) block and each B independently is a poly(conjugated diene) block, n is an integer equal to or greater than 2 and X is the residue of a coupling agent.

5. The method according to claim 4 wherein said styrene/conjugated diene block copolymer is a radial styrene/butadiene block copolymer having a diblock content of between 65 and 85 mole percent.

6. The method according to claim 4 wherein said styrene/conjugated diene block copolymer is a styrene-butadiene diblock copolymer.

7. The method according to claim 4 wherein said sulfur-containing derivative is zinc dimethyl dithio carbamate.

8. The method according to claim 7 wherein said sulfur activator is zinc oxide and said solubilizing agent is calcium stearate.

9. The method according to claim 8 wherein said polymeric carrier is selected from the group consisting of ethylene/propylene rubber, and ethylene/vinyl acetate copolymers.

10. The method according to claim 8 wherein the polymeric carrier is a polyethylene having a number average molecular weight of 7700.

11. A method for preparing bitumen/elastomeric polymer compositions comprising:
   a. heating the bitumen in a stirred tank to a temperature of between 220 and 430° F.;
   b. adding the elastomeric polymer to the tank in an amount of between 2 and 30 weight percent, to form a mixture of bitumen and elastomeric polymer;
   c. adding 0.01 to 5 weight percent of a cross-linking composition to the mixture and continuing stirring while maintaining the temperature of the mixture at between 275 and 430° F. for a time period of between 20 and 120 minutes;
   wherein said cross-linking composition comprises:
      a. 5 to 50 percent by weight of elemental sulfur:
      b. 0.5 to 10 percent by weight of a sulfur-containing derivative selected from the group consisting of compounds having the formula

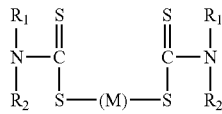

where $R_1$ and $R_2$ are like or different alky radicals having 1 to 4 carbon atoms and wherein M is selected from the group consisting of zinc, barium, copper, cadmium and thallium;

c. 5 to 50 percent by weight of a component selected from fatty acid derivatives of zinc; and d. 10 to 85 percent by weight of a polymeric carrier, said cross-linking composition having a zinc content of at least 2 weight percent, based on the total weight of the cross-linking composition and a zinc to sulfur content weight ratio of 0.5:1 to 2:1.

12. The method according to claim 1 wherein said bitumen is selected from the group consisting of straight-run bitumens and fluxed bitumens.

13. The method according to claim 2 wherein said elastomeric polymer is selected from the group consisting of butyl rubber, polybutadiene, polyisoprene, ethylene/propylene/diene (EPDM) terpolymers, and styrene/conjugated diene block copolymers.

14. The method according to claim 3 wherein said elastomeric polymer is a styrene/conjugated diene block copolymer having a structure represented by the following general formulae S—B—S, $(S—B)_n$—X, (S—B) or a mixture thereof, wherein each S independently is a poly(vinyl aromatic) block and each B independently is a poly(conjugated diene) block, n is an integer equal to or greater than 2 and X is the residue of a coupling agent.

15. The method according to claim 4 wherein said styrene/conjugated diene block copolymer is a radial styrene/butadiene block copolymer having a diblock content of between 65 and 85 mole percent.

16. The method according to claim 4 wherein said styrene/conjugated diene block copolymer is a styrene-butadiene diblock copolymer.

17. The method according to claim 8 wherein said polymeric carrier is selected from the group consisting of ethylene/propylene rubber, and ethylene/vinyl acetate copolymers.

* * * * *